(12) United States Patent
Warbeck

(10) Patent No.: US 11,926,429 B2
(45) Date of Patent: Mar. 12, 2024

(54) AIRCRAFT HAVING COOLING SYSTEM FOR DISTRIBUTING HEAT TRANSFER LIQUID TO DIFFERENT REGIONS OF AIRCRAFT

(71) Applicant: Dr. Ing. h.c. F. Porsche Aktiengesellschaft, Stuttgart (DE)

(72) Inventor: Thomas Warbeck, Lauffen am Neckar (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 115 days.

(21) Appl. No.: 17/718,489

(22) Filed: Apr. 12, 2022

(65) Prior Publication Data

US 2022/0267020 A1 Aug. 25, 2022

Related U.S. Application Data

(63) Continuation-in-part of application No. 16/460,437, filed on Jul. 2, 2019, now abandoned.

(30) Foreign Application Priority Data

Jul. 4, 2018 (DE) .......................... 102018116144.1

(51) Int. Cl.
*B64D 13/06* (2006.01)
*B64C 3/38* (2006.01)
(Continued)

(52) U.S. Cl.
CPC .............. *B64D 33/08* (2013.01); *B64C 3/38* (2013.01); *B64C 29/0008* (2013.01);
(Continued)

(58) Field of Classification Search
CPC ......... B64C 27/20; B64C 27/22; B64C 27/26; B64C 27/28; B64C 27/30; B64C 29/00; B64C 29/0008; B64C 29/0016; B64C 29/0033; B64C 29/0091; B64C 39/00; B64C 39/10; B64C 2039/105; B64C 2201/042; B64C 3/38; B64D 13/006;
(Continued)

(56) References Cited

U.S. PATENT DOCUMENTS

| 2,712,421 | A | 7/1955 | Naumann |
| 8,123,460 | B2 * | 2/2012 | Collette ............... B64D 13/006 361/699 |

(Continued)

FOREIGN PATENT DOCUMENTS

| CN | 105408207 A | 3/2016 |
| CN | 107207087 A | 9/2017 |

(Continued)

OTHER PUBLICATIONS

Chinese Office Action with Search Report for Chinese Application No. 201910593193.9, dated Aug. 29, 2022, 10 pages.

*Primary Examiner* — Christopher D Hutchens
*Assistant Examiner* — Michael A. Fabula
(74) *Attorney, Agent, or Firm* — Buchanan Ingersoll & Rooney PC

(57) ABSTRACT

An aircraft includes electrical components and a ducted fan with a cooling coil. The aircraft is designed to discharge heat from the electrical components to the cooling coil.

11 Claims, 5 Drawing Sheets

(51) Int. Cl.
*B64C 29/00* (2006.01)
*B64D 27/24* (2006.01)
*B64D 33/08* (2006.01)

(52) U.S. Cl.
CPC ...... *B64D 27/24* (2013.01); *B64D 2013/0614* (2013.01); *B64D 2013/0674* (2013.01)

(58) Field of Classification Search
CPC ........ B64D 33/00; B64D 33/08; B64D 33/10; B64D 27/24; B64D 2013/0614; B64D 2013/0674; F04D 29/58; B64U 20/90; B64U 20/92; B64U 20/94; B64U 20/98
See application file for complete search history.

(56) References Cited

U.S. PATENT DOCUMENTS

| | | | | |
|---|---|---|---|---|
| 8,181,903 | B2 * | 5/2012 | Posva | B64C 15/14 |
| | | | | 244/12.3 |
| 8,424,285 | B2 * | 4/2013 | Veilleux, Jr. | H05K 7/20218 |
| | | | | 60/39.83 |
| 9,162,770 | B2 | 10/2015 | Stückl et al. | |
| 9,676,479 | B2 * | 6/2017 | Brody | B64C 9/00 |
| 9,714,090 | B2 * | 7/2017 | Frolov | G08G 5/0013 |
| 9,856,018 | B2 * | 1/2018 | King | B64C 29/0025 |
| 10,040,547 | B1 * | 8/2018 | Pedigo | B64C 39/10 |
| 10,131,426 | B2 | 11/2018 | Judas et al. | |
| 10,138,899 | B2 * | 11/2018 | Joubert | F04D 29/584 |
| 10,427,784 | B2 * | 10/2019 | Parks | B64C 29/0091 |
| 11,358,714 | B2 * | 6/2022 | Bender | B64D 27/24 |
| 11,370,323 | B2 * | 6/2022 | Fauri | B64C 11/001 |
| 2003/0106959 | A1 * | 6/2003 | Fukuyama | B64C 29/0033 |
| | | | | 244/12.4 |
| 2005/0223693 | A1 | 10/2005 | Siebert | |
| 2007/0215748 | A1 * | 9/2007 | Robbins | B64C 39/024 |
| | | | | 244/12.5 |
| 2007/0246601 | A1 * | 10/2007 | Layton | B64C 29/0025 |
| | | | | 244/12.2 |
| 2010/0021288 | A1 | 1/2010 | Collette | |
| 2013/0167800 | A1 * | 7/2013 | Mulay | B22D 19/04 |
| | | | | 164/91 |
| 2016/0273448 | A1 | 9/2016 | Duprez | |
| 2019/0203735 | A1 * | 7/2019 | Hoefler | F04D 19/002 |
| 2020/0009974 | A1 * | 1/2020 | Bender | B64D 27/24 |
| 2020/0010209 | A1 * | 1/2020 | Bender | H01M 10/613 |
| 2020/0354052 | A1 * | 11/2020 | Chew | B64C 13/16 |
| 2022/0267020 | A1 * | 8/2022 | Warbeck | B64D 27/24 |
| 2023/0174253 | A1 * | 6/2023 | Chew | B64C 39/024 |
| | | | | 244/17.23 |
| 2023/0182897 | A1 * | 6/2023 | Chew | B64U 10/20 |
| | | | | 244/6 |
| 2023/0257104 | A1 * | 8/2023 | Chew | B64U 50/14 |
| | | | | 244/7 R |

FOREIGN PATENT DOCUMENTS

| | | |
|---|---|---|
| CN | 206939095 U | 1/2018 |
| DE | 602004012685 T2 | 7/2008 |
| DE | 202010016892 U1 | 8/2011 |
| DE | 102011105880 A1 | 12/2012 |
| DE | 202015003815 U1 | 7/2015 |
| DE | 202015007089 U1 | 11/2015 |
| DE | 202018000856 U1 | 3/2018 |
| WO | 2014135431 A1 | 9/2014 |

* cited by examiner

AIRCRAFT HAVING COOLING SYSTEM FOR DISTRIBUTING HEAT TRANSFER LIQUID TO DIFFERENT REGIONS OF AIRCRAFT

CROSS-REFERENCE TO RELATED APPLICATION

This application is a U.S. continuation in part application of U.S. application Ser. No. 16/460,437, which claims priority to German Patent Application No. 10 2018 116 144.1, filed Jul. 4, 2018, the content of such applications being incorporated by reference herein in their entirety.

FIELD OF THE INVENTION

The present invention relates to an aircraft, in particular a fully electric vertical take-off and landing (VTOL) aircraft.

BACKGROUND OF THE INVENTION

VTOL is the cross-language name given in the aerospace industry to any type of aircraft, drone or rocket which has the capability to take off and land again substantially vertically and without a runway. This collective term is used below in a broad sense which includes not only fixed-wing aircraft with wings, but rather also rotary-wing aircraft such as helicopters, gyrocopters, gyrodynes and hybrids such as composite or combination helicopters and convertiplanes. Furthermore, short take-off and landing (STOL) aircraft, short take-off and vertical landing (STOVL) aircraft or vertical take-off and horizontal landing (VTHL) aircraft are included.

US20160273448A1, which is incorporated by reference herein, discloses a ducted fan turbine engine. The engine comprises an oil circuit with an air/oil cooler. In order to increase the capacity of the cooler, the cooler is equipped with an apparatus for injecting water. The thermal capacity of the water intensifies the cooling, while the removal of the water by suction increases the thrust of the turbine engine.

CN206939095U, which is incorporated by reference herein, appears to disclose a similar apparatus.

SUMMARY OF THE INVENTION

One benefit of the aircraft described herein is the ability to provide efficient cooling without aerodynamic losses which is created.

The aircraft may therefore be equipped, for instance, with bent or even selectively bendable wings. A corresponding variant increases the effective wing surface during horizontal flight, without however increasing the footprint of the aircraft.

Furthermore, the aircraft may have a fast-charging battery system which provides the drive energy for vertical take-off and landing and also horizontal flight and allows quick charging of the aircraft when stationary.

In this case, instead of freely moving rotors, a plurality of ducted fans, including of different sizes, as are known outside of the aerospace industry, for instance for hovercraft or airboats, may be used to drive the aircraft. The cylindrical housing surrounding the fan may considerably reduce the thrust losses caused by vortexes at the blade tips in an embodiment of said kind. Suitable ducted fans may be aligned horizontally or vertically, designed so as to be able to pivot between both positions or be covered by louvers during horizontal flight for aerodynamic reasons. In addition, pure horizontal thrust generation using fixed ducted fans is conceivable.

In addition to preferably fully autonomous operation of the aircraft—it is also possible to consider granting manual control to human pilots if they are sufficiently qualified, this giving the apparatus according to aspects of the invention the greatest possible degree of flexibility in terms of handling.

Details of the wings may be disclosed in U.S. Pat. No. 2,712,421, and further details of the propellers and rotors may be disclosed in U.S. patent Ser. No. 10/131,426, each of which is incorporated by reference herein in its entirety.

BRIEF DESCRIPTION OF THE DRAWING

One exemplary embodiment of the invention is illustrated in the drawing and will be described in more detail below.

DETAILED DESCRIPTION OF THE INVENTION

The terms 'fan,' 'rotor' and 'propeller' may be used interchangeably herein.

Figure 1:
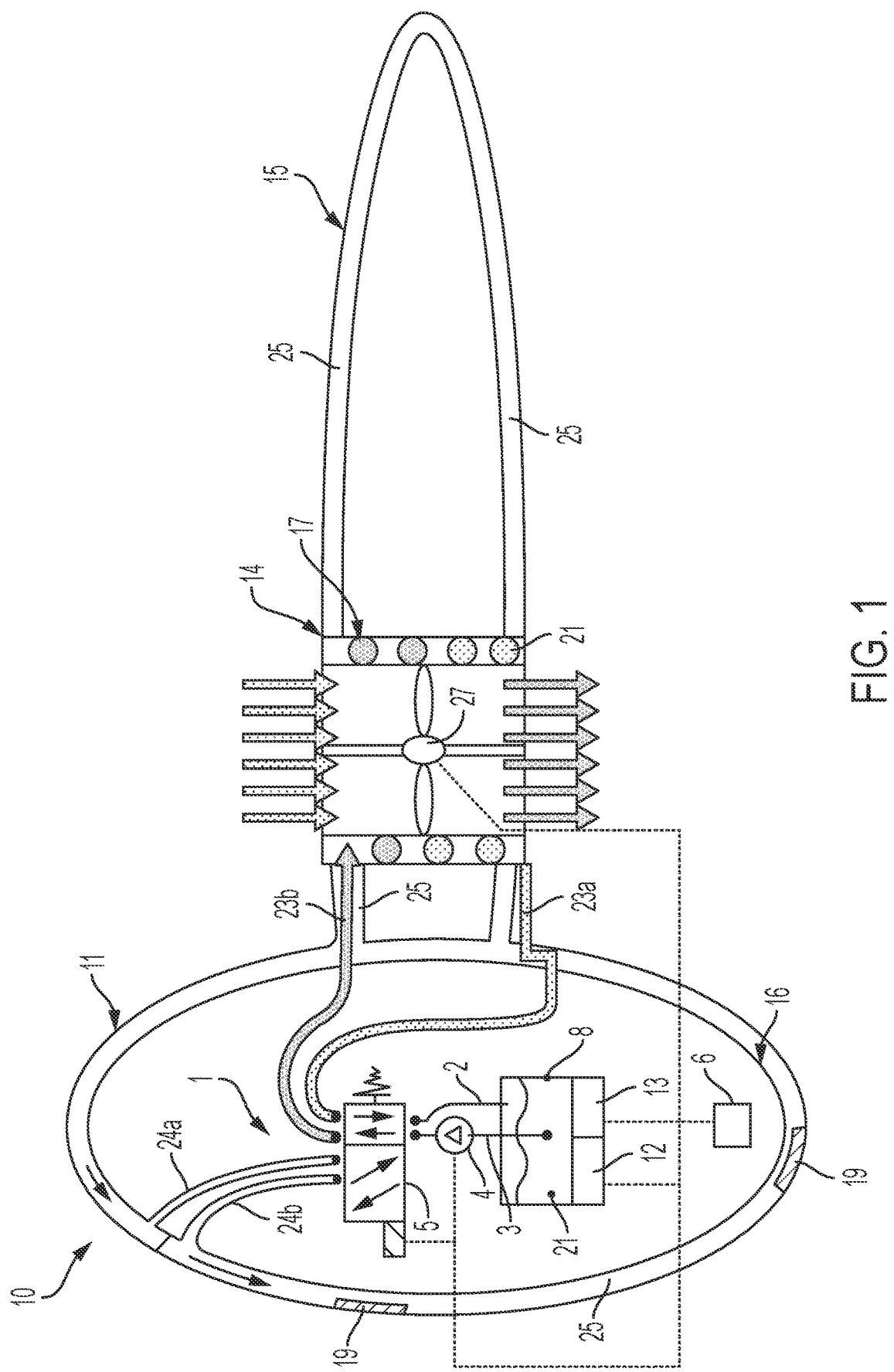
FIG. 1 shows the partial cross section through an aircraft according to aspects of the invention, wherein the aircraft is shown schematically.

FIG. 1 illustrates the structural features of a vertical take-off and landing aircraft 10 (a portion of the aircraft 10 shown) having a fuselage 11, wings 15, electrical components (battery 13, inverter 12 and electric motor 27), a ducted fan 14 integrated in the wing 15 for generating vertical lift. The ducted fan 14 has a cooling coil 17. The battery 13 and inverter 12 may together be configured to power the ducted fan 14.

The surface of the cooling coil 17 can be designed to be largely smooth—and therefore aerodynamically optimum—by laminating the cooling coil 17 in composite fiber or to have cooling ribs on the cooling coil 17 for maximizing the cooling power.

Aircraft 10 includes a cooling system 1 for cooling the electrical components (i.e., battery 13, inverter 12 and electric motor 27). System 1 includes a fluid reservoir 8 for holding a heat-transfer liquid 21 (liquid level indicated by the wavy line). Battery 13, inverter 12 and motor 27 may be in direct thermal contact with reservoir 8 to directly transfer thermal energy between the liquid 21 and those electrical components. Alternatively, reservoir 8 may be connected to those electrical components by one or more fluid passageways for transferring thermal energy therebetween. The position of the components is not limited to beneath reservoir 8.

Fluid reservoir 8 (optionally) includes one port through which heat-transfer liquid 21 is delivered into reservoir 8 via fluid line 2, and another port through which liquid is removed from reservoir 8 via fluid line 3. A pump 4 is connected to fluid line 3 for removing liquid 21 from reservoir 8. Fluid lines 2 and 3 are connected to a two-way spring loaded and solenoid actuated valve 5 having two blocks. The solenoid of valve 5 (shown schematically) and pump 4 are controlled by a controller/processor 6 by way of a wired or wireless connection.

In the position of valve 5 that is shown in FIG. 1, the right-side block of valve 5 is connected to conduits 23a and 23b, such that fluid line 2 is fluidly connected to conduit 23a and fluid line 3 is connected to conduit 23b. Conduit 23b is configured to deliver the heated liquid 21 to cooling coil 17 and conduit 24b is configured to deliver the cooled liquid 21 from cooling coil 17, the purpose of which will be described later.

In the other position of valve 5, the left-side block of valve 5 is connected to conduits 24a and 24b, such that fluid line 2 is fluidly connected to conduit 24a and fluid line 3 is connected to conduit 24b. Conduit 24b is configured to deliver the heated liquid 21 to a fluid passageway 25 that is formed in fuselage 11 and conduit 24b is configured to deliver the cooled liquid 21 from passageway 25, the purpose of which will also be described later.

During operation of aircraft 10, the maximum power requirement and therefore the maximum cooling requirement occurs during vertical flight; however, in this vertical flight phase, the lowest cooling power can be achieved by means of the convection on the outer skin of the aircraft 10 since the relative speed between the ambient air and the aircraft 10 is low. Therefore, according to aspects of the invention, the high air speeds in the region of the ducted fan 14 which is active during take-off and landing are utilized for cooling the electrical components (12, 13, 27) by introducing heat-transfer liquid 21 into the cooling coil 17 of the ducted fan 14 by way of conduits 23a and 23b.

During horizontal flight, the highest cooling power can be achieved by means of the convection on the outer skin of the aircraft 10 since the relative speed between the ambient air and the aircraft 10 is high. Therefore, according to aspects of the invention, the high air speeds in the region of the outer skin of the aircraft which is active during horizontal flight (i.e., cruising) are utilized for cooling the electrical components (12, 13, 27) by introducing heat-transfer liquid 21 into passageway 25 formed on the outer skin by way of conduits 24a and 24b.

Turning now to the operation of cooling system 1, during vertical flight, controller/processor 6 moves valve 5 to the position shown in FIG. 1 and then activates pump 4. Pump 4 draws heat-transfer liquid 21 from reservoir 8, through line 3, into conduit 23b, through coil 17, into conduit 23a, through line 2 and back into reservoir 8. It should be understood that liquid 21 draws heat from liquid-cooled components such as the high-voltage battery 13, inverter 12 and any electric motors 27 and discharges said heat via the ducted fan 14 and its cooling coil 17.

During horizontal flight, controller/processor 6 moves valve 5 to the right position such that fluid line 2 is fluidly connected to conduit 24a and fluid line 3 is connected to conduit 24b. Controller/processor 6 then activates pump 4. Pump 4 draws heat-transfer liquid 21 from reservoir 8, through line 3, into conduit 24b, through passageway 25, into conduit 24a, through line 2 and back into reservoir 8. It should be understood that liquid 21 draws heat from liquid-cooled components such as the high-voltage battery 13, inverter 12 and any electric motor 27 and discharges said heat via the fuselage 11 and wings 15.

During horizontal flight the liquid 21 is not guided through the ducted fans 14 but rather extensively through passageway 25 and into the fuselage 11 and wings 15 of the aircraft 10. As a result, the heat-transferring surface area can be maximized and the waste heat produced during horizontal flight can be discharged to the surrounding area. A cooling structure 16 on the inner skin of the fuselage 11 or the wings 15 can be incorporated by lamination or else connected in a thermally contacting manner to filler or other interface materials 19 (two segments shown). Interface materials 19 may be positioned within the passageway 25, as shown. The liquid 21 travels over the interface materials 19.

During the transition from horizontal flight to vertical flight (e.g., landing), a changeover is again made to cool liquid 21 via duct 17, as was described above. Appropriate cooling without a significant increase in the air resistance can be provided in this way.

Controller/processor 6 is also connected to fan 14. When fan 14 is operational during vertical flight and operating above a pre-determined speed (as sensed or controlled by controller 6 or sensed by a rotational speed sensor), controller/processor 6 automatically controls valve 5 to deliver liquid 21 into coils 17, as was described above. Alternatively, during periods when fan 14 is either not operational or operating below a pre-determined speed during horizontal flight (as sensed or controlled by controller 6 or sensed by a rotational speed sensor), controller/processor 6 automatically controls valve 5 to deliver liquid 21 into passageway 25, as was described above. Control of valve 5 may also be manual, if so desired. Alternatively, controller/processor 6 may control valve 5 as a function of horizontal air speed, vertical air speed, GPS, or an altimeter, which components form part of aircraft 10. Controller/processor 6 may form part of a computer within aircraft 10.

Figure 2:
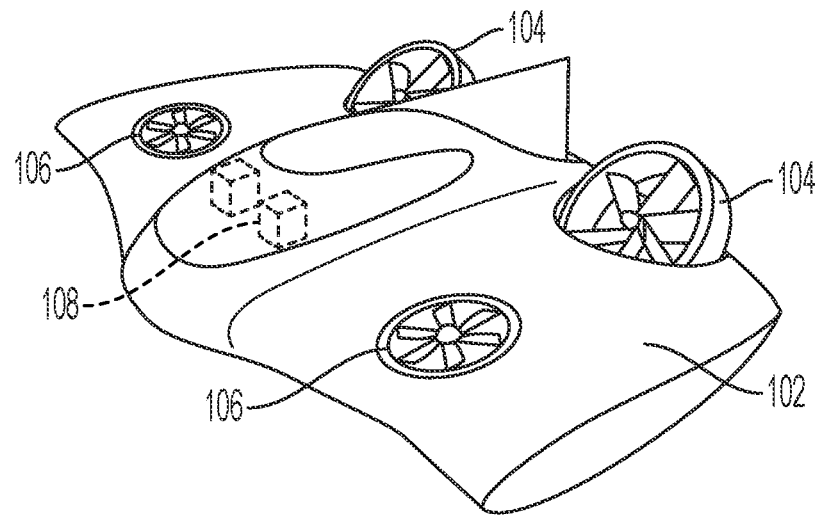
FIG. 2 depicts an isometric view of an aircraft, wherein the wings are shown in an extended configuration and the rear propellers are shown in an angled orientation.
Figure 3:
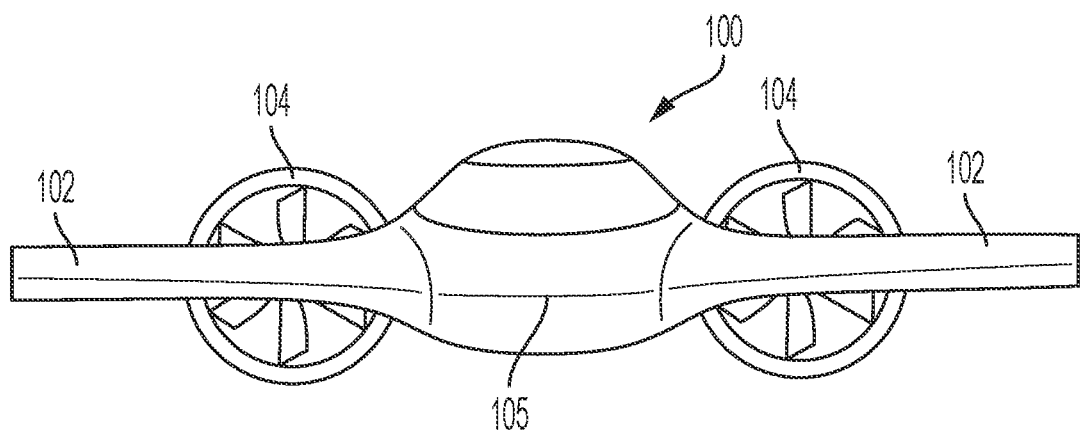
FIG. 3 depicts a front elevation view of the aircraft of FIG. 2, wherein the wings are shown extended configuration and the rear propellers are shown in a cruising orientation.
Figure 4:
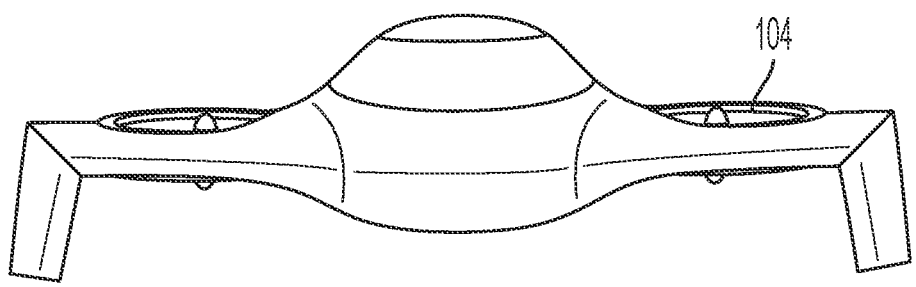
FIG. 4 depicts another front elevation view of the aircraft, wherein the wings are shown in a folded configuration and the rear propellers are shown in a take-off/landing orientation.

FIGS. 2-4 depict an aircraft 100. The aircraft 100 shown in those figures may appear different from the previously described aircraft 10, however, most (if not all) of the details of the previously described aircraft 10 also apply to aircraft 100.

The aircraft 100 includes foldable wings 102. The wings 102 are shown in a folded configuration in FIG. 4 and an extended configuration in FIG. 3. A motor or solenoid is configured to move the wings between those configurations.

Rear propellers 104 are mounted on the trailing edge of the airfoils or wings 102 (i.e., the edge furthest from the nose 105). Propellers 104 may be referred to as cruising propellers because they are used during the cruising operation of the aircraft (at least in one position of the propellers 104). The propellers 104 are configured to pivot between two different positions, as shown in FIGS. 2-4. In the vertical position of the propellers 104 shown in FIG. 3, the propellers 104 generate maximum horizontal thrust for cruising operation of the aircraft (i.e., while the aircraft is flying through the air). In the horizontal position of the propellers 104 shown in FIG. 4, the propellers 104 generate maximum vertical thrust for take-off and landing operations of the aircraft. A motor or solenoid is configured to move the propellers 104 between those two positions.

Alternatively, the propellers 104 may be immovable and fixed in a vertical position, as shown in FIG. 2.

Horizontally mounted propellers 106 (i.e., horizontally mounted to the wings and having a vertical axis of rotation)

are fixedly mounted and integrated into the wings 102. Unlike the propellers 104, the position of the propellers 106 is fixed, however, those skilled in the art will recognize that the propellers 106 could be modified so that they are pivotable between vertical and horizontal positions. The propellers 106 generate maximum vertical thrust for take-off and landing operations of the aircraft. The propellers 106 may also be referred to herein as lifting propellers.

The coils 17 may be incorporated into propellers 104 as well as propellers 106.

The propellers 104 and 106, which may also be referred to herein as fans, may be operated by a fully-electric drive. To that end, a battery charging system 108 including a charger, an inverter and a fast-charging battery are positioned within the fuselage of the aircraft for powering the propellers 104 and 106. The fuselage may also be configured to carry one or more passengers.

Figure 5:
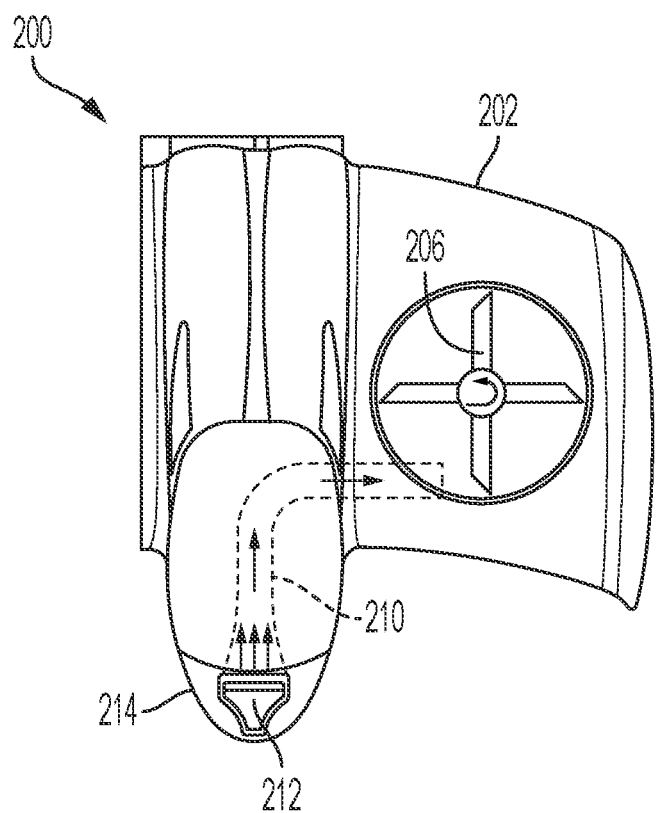
FIG. 5 depicts a top plan view of a portion of an aircraft, showing an internal duct extending between a nose of the aircraft and a horizontal fan mounted to the wing.
Figure 6:
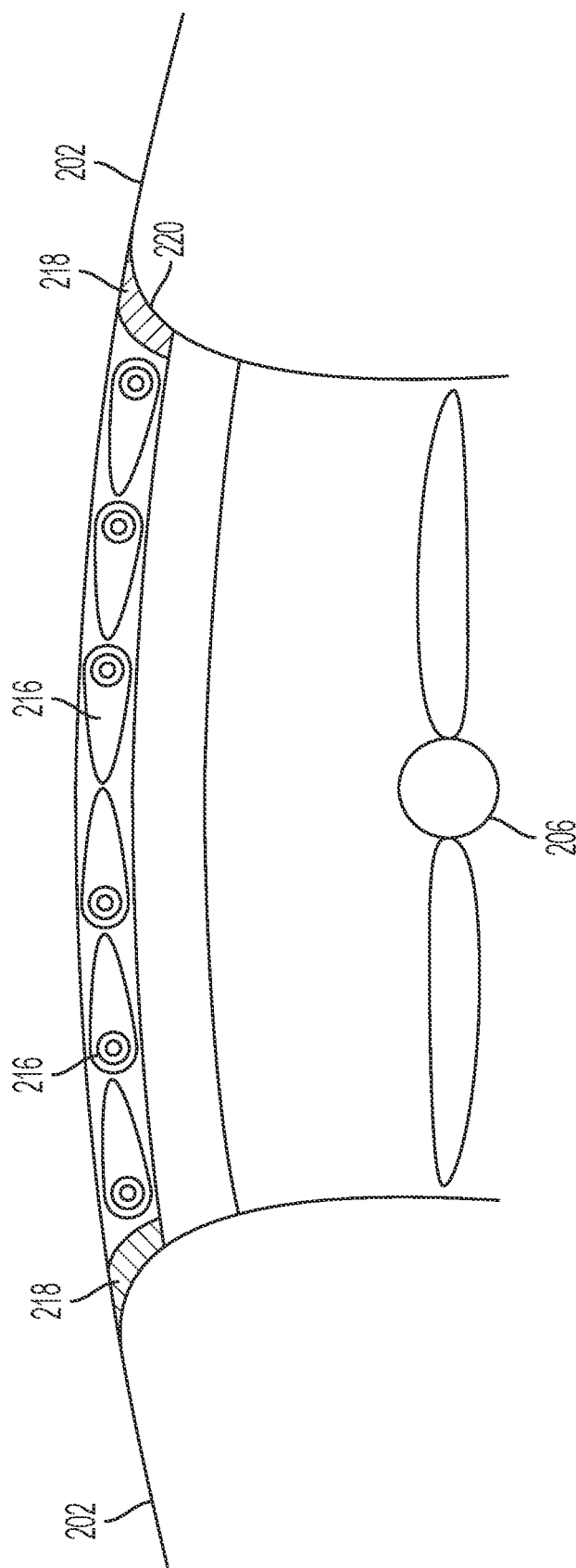
FIG. 6 depicts moveable louvers applied on top of the horizontal fan of FIG. 5, wherein the louvers are shown in a closed position.
Figure 7:
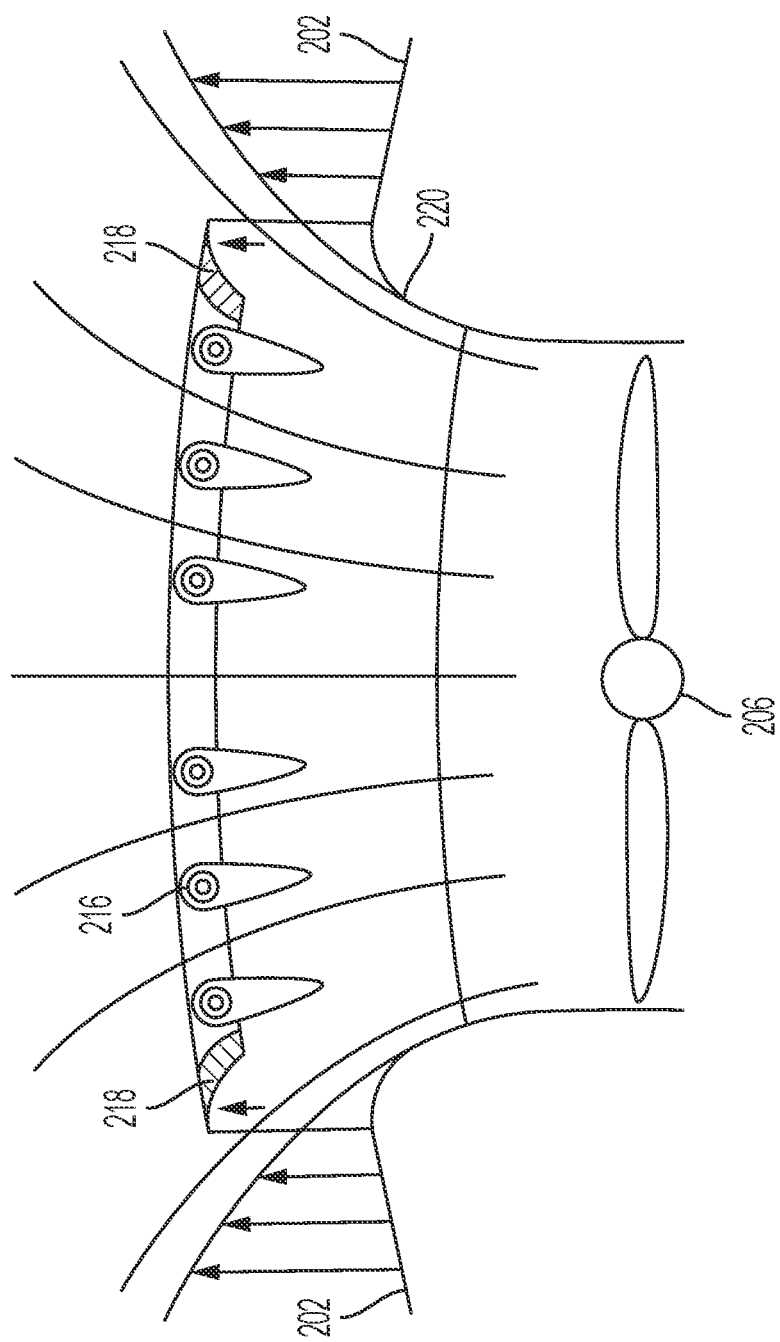
FIG. 7 depicts the movable louvers of FIG. 6, wherein the louvers are shown in an open position.

FIGS. 5-7 depict views of an aircraft 200. The aircraft 200 shown in those figures may appear different from the previously described aircraft 100, however, most (if not all) of the details of the previously described aircraft 100 also apply to aircraft 200. Only a segment of the aircraft 200 is shown in FIG. 5. An air duct 210 extends between an opening 212 formed on the nose 214 of the aircraft 200 and the horizontally mounted propeller 206 that is fixedly mounted to the wing 202. In operation, air is delivered to the propeller 206 via the duct 210, as depicts by the arrows. Although not shown, air ducts that are similar to duct 210, may extend to the propeller 206 on the opposite wing 202, as well as any rear propellers 104 (not shown in these views). Accordingly, the propellers may be referred to as either "ducted propellers" or "ducted fans."

FIGS. 6 and 7 depict louvers 216 that are configured to selectively cover the horizontally mounted propellers 206. It is noted that the louvers 216 are omitted from FIG. 5 for clarity purposes. Each louver 216 is rotatable about a shaft (or otherwise moveable) between a closed position (FIG. 6) and an open position (FIG. 7). The louvers 216, which are flush with the top face of the wing 202, may be moved to the closed position during the cruising operation of the aircraft 200 for aerodynamic purposes. The louvers 216 may be moved to an open position at any time during operation of the propellers 206 to permit the exit or entrance of air therethrough. A motor or solenoid is configured to move the louvers 216 between those positions. It is noted that the louvers are shown in a closed position in FIG. 2.

A sealing ring 218 surrounds the louvers 216 and is moveable between a retracted position (FIG. 6) and a deployed position (FIG. 7). The louvers 216 are mounted to the sealing ring 218 and move therewith between the retracted and deployed positions. The lower surface of the sealing ring 218 is configured to be in sealing relationship with an opening 220 formed in the wing 202. It should be understood that the opening 220 accommodates the body of the propeller 206. The sealing ring 218 may be moved to the retracted position, which is flush with the top face of the wing 202, during cruising operation of the aircraft 200 for aerodynamic purposes. Alternatively, the sealing ring 218 may be moved to the deployed (i.e., extended) position at any time during operation of the propellers 206 to permit the exit or entrance of air, as depicted by the arrows in FIG. 7. A motor or solenoid is configured to move the sealing ring 218 between those positions.

What is claimed is:

1. An aircraft configured for vertical and horizontal flight, the aircraft comprising:
   a ducted fan with a cooling coil surrounding the ducted fan, the ducted fan having a vertically-extending axis of rotation,
   a battery for powering the ducted fan, and
   a cooling system for cooling the battery,
   wherein, during vertical flight of the aircraft, the cooling system is configured to discharge heat from the battery by delivering a heat transfer liquid to the cooling coil, and
   wherein, during horizontal flight of the aircraft, the cooling system is configured to deliver the heat transfer liquid into contact with an outer layer of the aircraft and bypass the cooling coil.

2. The aircraft as claimed in claim 1, further comprising a fuselage and a wing, wherein the battery is arranged in the fuselage and the ducted fan is arranged in the wing.

3. The aircraft as claimed in claim 2, wherein during horizontal flight of the aircraft, the cooling system is configured to deliver the heat transfer liquid through a passageway defined in the fuselage for heat exchange.

4. The aircraft as claimed in claim 1, further comprising an inverter connected to the battery.

5. The aircraft as claimed in claim 1, wherein the ducted fan has an electric drive.

6. The aircraft as claimed in claim 1, wherein the aircraft comprises bent wings.

7. The aircraft as claimed in claim 1, wherein the aircraft has louvers that are configured to selectively cover the ducted fan.

8. The aircraft as claimed in claim 1, wherein the aircraft further comprises fixed ducted fans having a horizontally oriented axis of rotation for generating propulsion during horizontal flight of the aircraft.

9. The aircraft as claimed in claim 1, wherein the ducted fan is configured to generate propulsion in a vertical direction during take-off and landing of the aircraft.

10. The aircraft as claimed in claim 1, wherein the cooling system comprises a reservoir for the heat transfer liquid, a pump and a valve.

11. The aircraft as claimed in claim 10, wherein the valve is movable between a first position in which the pump delivers the heat transfer liquid through the valve and to the cooling coil, and a second position in which the pump delivers the heat transfer liquid through the valve and through a passageway defined in a fuselage of the aircraft, wherein the passageway is defined between a layer and an outermost layer of the fuselage.

* * * * *